(12) United States Patent
Burns et al.

(10) Patent No.: US 8,987,151 B2
(45) Date of Patent: Mar. 24, 2015

(54) FIBER-BASED CARPET CUSHION WITH ADDED RESILIENCE FROM VERTICALLY ORIENTED FIBER CONSTRUCTION

(75) Inventors: Jim Burns, Rocky Face, GA (US); John J. M. Rees, Chattanooga, TN (US); Tom Odum, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 783 days.

(21) Appl. No.: 13/114,498

(22) Filed: May 24, 2011

(65) Prior Publication Data

US 2011/0311758 A1 Dec. 22, 2011

Related U.S. Application Data

(60) Provisional application No. 61/347,687, filed on May 24, 2010.

(51) Int. Cl.
*D04H 1/74* (2006.01)
*B32B 3/28* (2006.01)
*B32B 3/26* (2006.01)
*D04H 1/4274* (2012.01)
(Continued)

(52) U.S. Cl.
CPC ............ *D04H 1/4274* (2013.01); *B32B 5/12* (2013.01); *D04H 1/42* (2013.01); *D04H 1/74* (2013.01)
USPC ........... 442/366; 442/381; 442/395; 442/402; 442/409; 428/181; 428/182; 428/183; 428/184; 428/86; 428/119; 428/156

(58) Field of Classification Search
CPC ......... D04H 1/4274; D04H 1/42; D04H 1/44; D04H 1/46; D04H 1/54; D04H 1/541; D04H 1/542; D04H 1/559; D04H 1/74; D04H 1/70; D04H 13/001; B32B 5/12; B32B 5/145; B32B 5/26; B32B 3/00; B32B 3/26; B32B 3/263; B32B 5/022; B32B 5/06; B32B 5/08
USPC ........... 428/86, 119, 156, 174, 175, 176, 181, 428/182, 183, 184; 442/366, 381, 395, 402, 442/409
See application file for complete search history.

(56) References Cited

U.S. PATENT DOCUMENTS 4,111,733 A * 9/1978 Periers .......................... 156/204
5,167,740 A * 12/1992 Michaelis et al. ........... 156/73.1
(Continued)

FOREIGN PATENT DOCUMENTS

CA    2472851 A1    1/2006
FR    2759384 A1 *  8/1998
(Continued)

OTHER PUBLICATIONS

Derwent entry for WO 2011/149925 A1, Dec. 1, 2011.*
(Continued)

*Primary Examiner* — Cheryl Juska
(74) *Attorney, Agent, or Firm* — Ballard Spahr LLP

(57) ABSTRACT

A fiber pad having a core non-woven layer is disclosed. The core layer can have an upper surface and a lower surface. The core layer can comprise at least one fiber layer. The at least one fiber layer can comprise a plurality of parallel fibers. Selected groups of the parallel fibers can be folded into desired pleated configurations. Optionally, the core layer can comprise post-consumer carpet materials.

31 Claims, 5 Drawing Sheets

(51) Int. Cl.
*B32B 5/12* (2006.01)
*D04H 1/42* (2012.01)

(56) References Cited

U.S. PATENT DOCUMENTS

| | | | | |
|---|---|---|---|---|
| 5,260,545 A | * | 11/1993 | West et al. | 219/130.1 |
| 5,402,615 A | | 4/1995 | Knott et al. | |
| 5,558,924 A | * | 9/1996 | Chien et al. | 428/181 |
| 6,008,149 A | | 12/1999 | Copperwheat | |
| 6,602,581 B2 | * | 8/2003 | Aneja | 428/182 |
| 8,534,419 B2 | * | 9/2013 | Coates et al. | 181/294 |
| 2001/0009711 A1 | * | 7/2001 | Latimer et al. | 428/182 |
| 2003/0022584 A1 | * | 1/2003 | Latimer et al. | 442/414 |
| 2003/0118785 A1 | * | 6/2003 | Aneja | 428/182 |
| 2004/0180177 A1 | | 9/2004 | Ray et al. | |
| 2004/0180592 A1 | | 9/2004 | Ray | |
| 2005/0158518 A1 | * | 7/2005 | Aneja | 428/167 |
| 2005/0275253 A1 | | 12/2005 | Priebe | |
| 2006/0289231 A1 | | 12/2006 | Priebe et al. | |
| 2008/0194163 A1 | * | 8/2008 | Swan et al. | 442/103 |
| 2009/0130403 A1 | * | 5/2009 | Sikkel et al. | 428/195.1 |
| 2009/0197051 A1 | * | 8/2009 | Swan et al. | 428/182 |
| 2011/0311758 A1 | * | 12/2011 | Burns et al. | 428/95 |
| 2012/0024626 A1 | * | 2/2012 | Coates et al. | 181/294 |
| 2012/0315816 A1 | * | 12/2012 | Fowler et al. | 442/327 |
| 2013/0327858 A1 | * | 12/2013 | Rees et al. | 241/24.1 |
| 2014/0014439 A1 | * | 1/2014 | Coates et al. | 181/294 |

FOREIGN PATENT DOCUMENTS

| | | |
|---|---|---|
| JP | 9021050 A | 1/1997 |
| JP | 10236206 A * | 9/1998 |
| WO | WO 9836114 A1 * | 8/1998 |
| WO | WO-02095111 A1 | 11/2002 |
| WO | WO 2010042993 A1 * | 4/2010 |
| WO | WO 2011149925 A1 * | 12/2011 |
| WO | WO 2012038737 A1 * | 3/2012 |

OTHER PUBLICATIONS

International Search Report and Written Opinion issued on Jul. 6, 2011 for Intl. App. No. PCT/US2011/037723, filed on May 24, 2011 (Inventor—J. Burns et al.; Applicant—Shaw Industries Group, Inc.).

* cited by examiner

FIBER-BASED CARPET CUSHION WITH ADDED RESILIENCE FROM VERTICALLY ORIENTED FIBER CONSTRUCTION

CROSS-REFERENCE TO RELATED APPLICATION

This application claims the benefit of priority to U.S. provisional application No. 61/347,687, filed on May 24, 2010, the entire disclosure of which is incorporated by reference herein.

FIELD OF THE INVENTION

This invention relates to a vertically lapped fiber pad comprising a plurality of parallel fibers. More specifically, this invention relates to a resilient fiber pad comprising a plurality of post consumer carpet fibers that are folded into desired pleated configurations.

BACKGROUND OF THE INVENTION

The carpet cushion industry offers several solutions for adding cushion to carpet. The most commonly used carpet cushioning products consist of frothed polyurethane, prime polyurethane, rebond, and rubber. Fiber pads only play a limited role in the carpet cushioning industry. Known fiber pads are manufactured using various non-woven techniques, including carding, cross-lapping, and needle punching. In these known fiber pads, the fibers are oriented in a common horizontal plane and lack the resiliency and compression-dampening needed for carpet cushioning. Airlaying can also be used to manufacture fiber pads. Although airlaying can produce fiber pads having at least some non-horizontal structure, these fiber pads still lack the resiliency and compression-dampening needed for carpet cushioning.

Thus, there is a need in the pertinent art for a fiber pad that possesses the resiliency and compression-dampening characteristics needed for carpet cushioning applications. Additionally, there is a need in the pertinent art for a fiber pad with desirable resiliency and compression-dampening characteristics that can be manufactured using post-consumer carpet in a low-cost manner.

SUMMARY OF THE INVENTION

The present invention provides a vertically lapped non-woven fiber pad. The vertically lapped pad can be formed by folding or pleating a non-woven fiber pad comprised of a plurality of fibers that are oriented substantially parallel. Once pleated, a portion of the plurality of fibers extends substantially vertically in the direction of the pleat. This substantially parallel orientation of fibers and vertical positions of fibers within the pleats provides improved resiliency and improved compression resistance relative to conventional cross-lapped fiber pads. The plurality of fibers within the fiber pad comprise post consumer carpet material of varying compositions. As discussed in more detail below, the pleated fiber pad may be formed in any desired size and thickness depending on the end use application. Additionally, the configuration of the pleats can also be customized according to any desired arrangement.

The pleated non-woven fiber pads disclosed herein can be generally formed by folding a core non-woven fiber layer having a longitudinal axis to provide a pleated non-woven fiber pad comprised of a plurality of pleats extending transverse to said longitudinal axis. After a pleat has been formed, fibers in adjacent pleats can be secured to one another by conventional means, including thermal bonding, adhesive bonding, or mechanical bonding such as horizontal needle punching.

In a further embodiment, the fiber pad can have a top layer attached thereto the upper surface of the core layer. In an additional embodiment, the fiber pad can have a bottom layer attached thereto the bottom surface of the core layer. The top and bottom layers can be cross-lapped with the core layer to provide additional dimensional stability to the fiber pad.

In one embodiment, it is specifically contemplated that the fiber pad can be used as a carpet cushion. However, it is contemplated that the fiber pad can be used in any application where a low-density, resilient cushioning pad is desirable, including, for example and without limitation, water filtration, artificial wetlands matrix core filling, microbial bio-film promotion, vehicle seating cushions, furniture seating cushions, decorative pillows, automotive carpet underlayment, automotive sound insulation, mattress cushions, and the like.

The fibers may optionally include heat activated binders or other binders, or the pleats may be mechanically bound together during the pleating process, for example, using needles inserted transversely to the pleats and causing fibers of adjacent pleats to intertwine. Fiber blends and/or weights may be chosen to optimize resilience or sound absorption, or to optimize both of these characteristics. Natural fibers deliver better sound absorption capabilities, while pleated mats formed at least partially of synthetic, thermoplastic fibers may be thermoformed into desired three-dimensional shapes.

As one having ordinary skill in the pertinent art will appreciate, the pleated configurations of the fibers can provide additional resiliency compared to conventional fiber pads, in which fibers are positioned in the same horizontal plane. Specifically, it is contemplated that the pleated configurations of the fibers can improve the compression-dampening characteristics of the core layer while minimizing the density of the core layer. It is further contemplated that the pleated configurations of the fibers can improve stability of the fiber pad in the longitudinal direction.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE INVENTION

Figure 1:
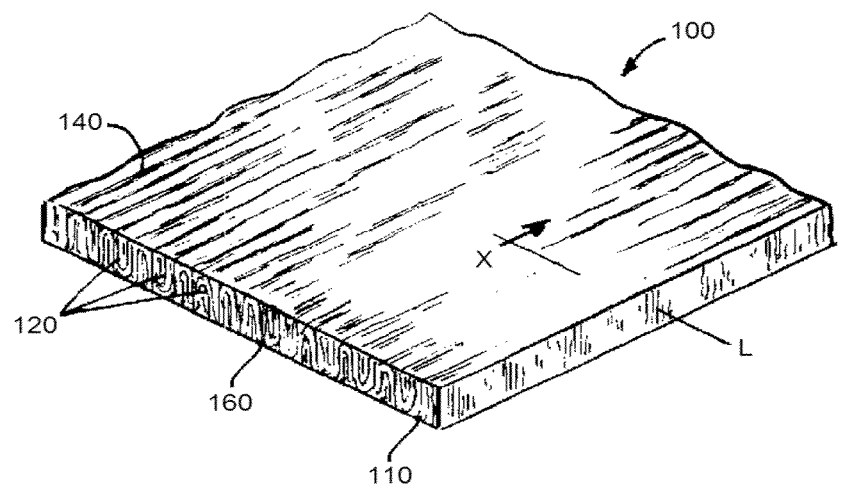
FIG. 1 is a perspective view of a pleated non-woven fiber pad according to the present invention.

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a pleat" can include two or more such pleats unless the context indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As summarized above, pursuant to various embodiments the present invention generally provides a pleated non-woven fiber pad formed from a plurality of fibers comprised of reclaimed carpet material. At least a portion of the fibers are oriented substantially parallel to one another and extend substantially vertically in the direction of the pleat. This substantially parallel orientation of fibers and vertical positions of fibers within the pleats provides improved resiliency and improved compression resistance relative to conventional cross-lapped fiber pads. As discussed in more detail below, the pleated fiber pad may be formed in any desired size and thickness depending on the end use application. Additionally, the configuration of the pleats can also be customized according to any desired arrangement.

With reference to FIG. 1, an exemplary pleated non-woven fiber pad 100 of the present invention is illustrated. The fiber pad comprises a core non-woven fiber layer 110 having a longitudinal axis "L" and being folded to provide a plurality of pleats 120. Pleats 120 extend horizontally in a direction "X" generally transverse to said longitudinal axis "L." Top and bottom fold portions of the pleats further form respective opposite top and bottom faces 140 and 160 of the core non-woven fiber layer. As exemplified in FIG. 2, The core non-woven fiber layer 110 is itself formed from a plurality of fibers 150 wherein at least a portion of the plurality of fibers are oriented substantially parallel to each other such that they extend in a vertical direction substantially transverse to said longitudinal axis "L" between the opposite top and bottom faces within the pleats.

Figure 2:
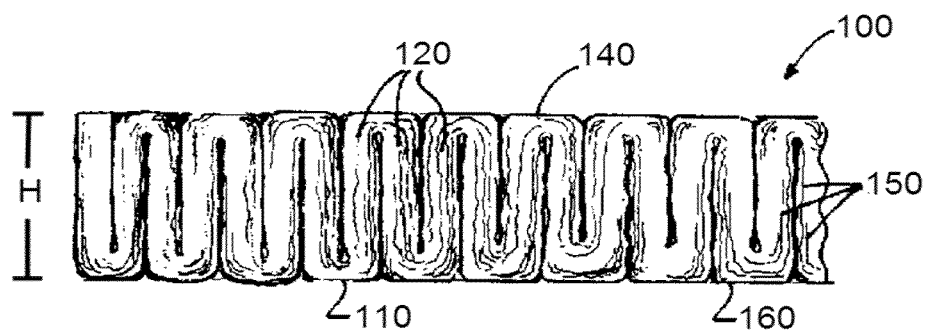
FIG. 2 is a cross sectional or side view of the pleated non-woven fiber pad illustrated in FIG. 1.

The plurality of pleats exemplified in FIG. 2 are substantially uniform in shape and size having, for example, substantially uniform pleat heights "H." However, it should be understood that the configuration of pleats can be customized in any desired arrangement, such as pleats of varying heights or pleats that are offset and interdigitated along the longitudinal axis of the pleated fiber pad. For example, with reference to FIGS. 3-6, exemplary configurations are provided showing the potential for customization of the pleat configuration. For ease of illustration, selected portions of the pleated non-woven fiber pad representing groupings of parallel fibers having different or customized pleat configurations are shown as pleated filaments.

Figure 3:
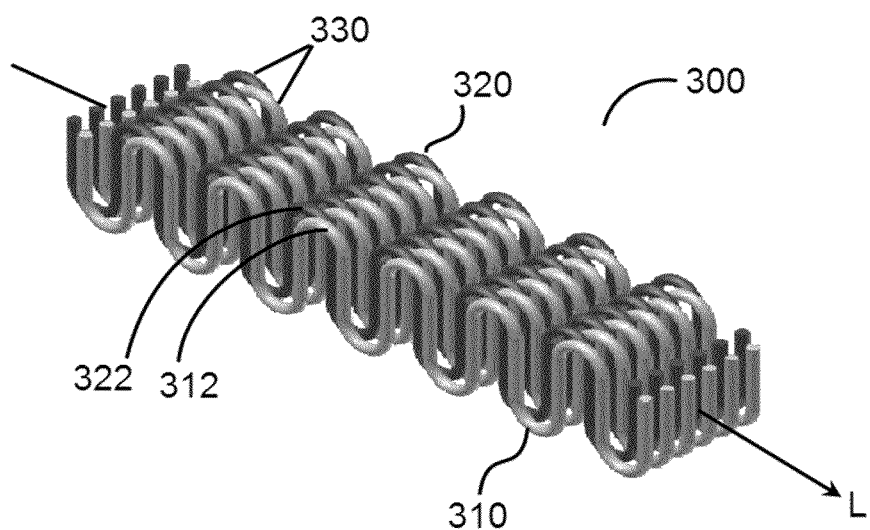
FIG. 3 is schematic illustration of an exemplary pleating configuration according to certain embodiments of the invention.

As shown in FIG. 3, a first portion of a pleated non-woven pad 300 represented by a grouping of parallel fibers 310 is folded to provide pleats having a substantially uniform height. A second portion of the pleated non-woven pad represented by a second grouping of substantially parallel fibers 320 is similarly folded to provide pleats having the same substantially uniform height as the first grouping of fibers 310. However, the pleated grouping 310 is offset from the second grouping 320 in the direction of the longitudinal axis "L" such that the result provides a staggered pleat configuration 330 comprising a plurality of offset male pleat elements 312 and 322. Further, as shown, the first and second groupings of parallel fibers are staggered in an alternating fashion such that the plurality of male pleat elements 312 and 322 are interdigitated.

Figure 4:
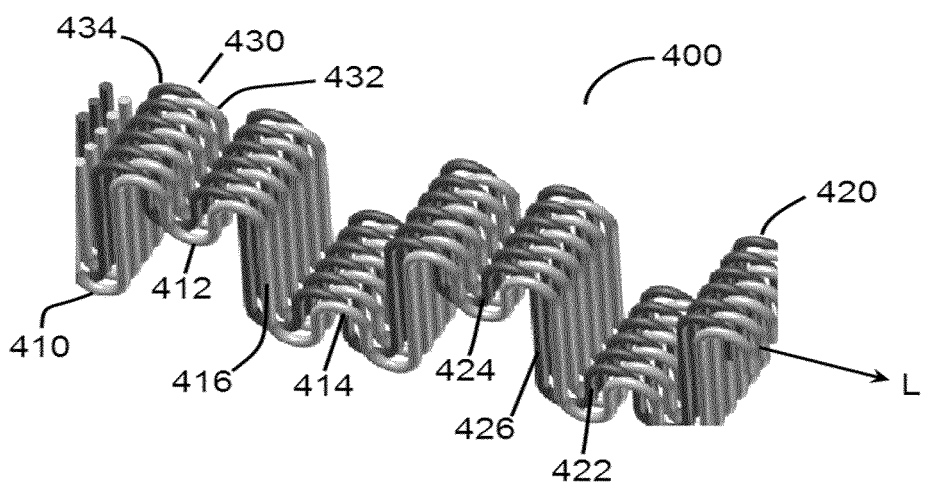
FIG. 4 is schematic illustration of an exemplary pleating configuration according to certain embodiments of the invention.

Alternatively, as shown in FIG. 4, a first portion of a pleated non-woven pad 400 represented by a first grouping of parallel fibers 410 is folded to provide pleats having varying pleat heights such as, for example, relatively short top and bottom pleats 412 and 414, separated by relatively long pleats 416. A second grouping of parallel fibers 420 can similarly be folded to provide pleats having varying pleat heights such as, for example, a relatively short top and bottom pleats 422 and 424, again separated by relatively long pleats 426. Still further, the pleated grouping 410 can, if desired, be offset from the second grouping 420 in the direction of the longitudinal axis "L" such that the result provides combined pleat configurations 430 comprising a plurality of male pleat elements 432 and 434. Further, as shown, the first and second groupings of parallel fibers can again be staggered in an alternating fashion such that the plurality of male pleat elements are interdigitated. It should be understood that when pleats of varying pleat heights are provided, at least one pleat having a first pleat height is be positioned adjacent to at least one pleat having a second different pleat height.

Figure 5:
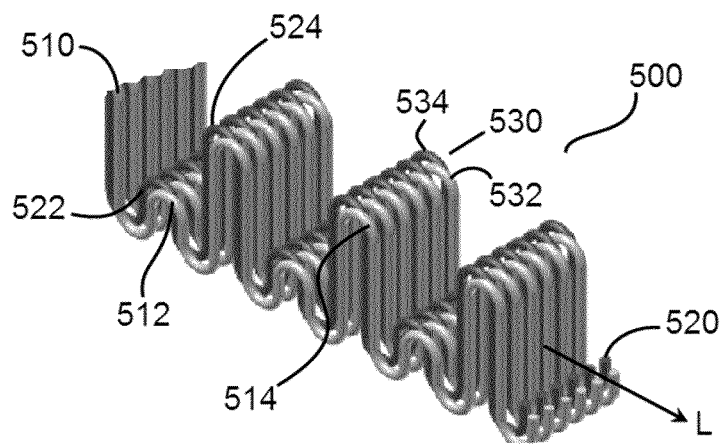
FIG. 5 is schematic illustration of an exemplary pleating configuration according to certain embodiments of the invention.
Figure 6:
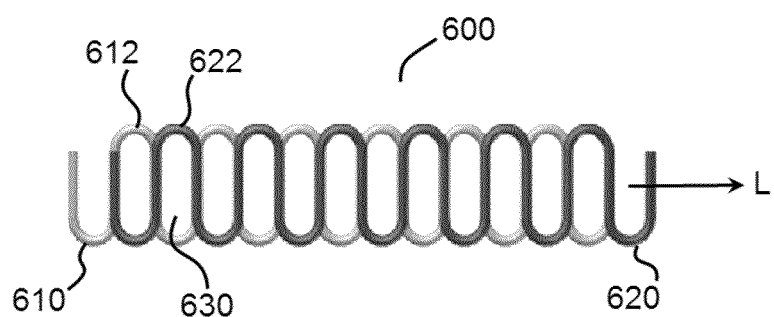
FIG. 6 is schematic illustration of an exemplary pleating configuration according to certain embodiments of the invention.

With reference to FIG. 5, in still a further configuration, a first portion of the pleated non-woven pad 500 represented by a first grouping of parallel fibers 510 can be folded to provide pleats having varying pleat heights such that, for example, relatively short pleats 512 alternate with relatively long pleats 514. A second portion of the non-woven pad represented by a second grouping of parallel fibers 520 can similarly be folded to provide pleats having varying pleat heights such that relatively short pleats 522 alternate with relatively long pleats 524. Still further, the pleated grouping 510 can, if desired, be offset from the second grouping 520 in the direction of the longitudinal axis "L" such that the result provides combined pleat configurations 530 comprising a plurality of male pleat elements 532 and 534. Further, as shown, the first and second groupings of parallel fibers can again be staggered in an alternating fashion such that the plurality of male pleat elements are interdigitated.

The distance that a pleated first portion of the non-woven pad can be offset in the direction of the longitudinal axis from a pleated second portion of the non-woven pad can be any desired distance. As shown for example in FIG. 6, a first portion of a pleated non-woven fiber pad 600 represented by a first grouping of parallel fibers 610 is folded to provide pleats 612 having a substantially uniform height. A second portion of the pleated non-woven fiber pad represented by a second grouping of substantially parallel fibers 620 is similarly folded to provide pleats 622 having the same substantially uniform height as the first grouping of fibers 610. However, the pleated grouping 610 is offset from the second grouping 620 in the direction of the longitudinal axis "L" such that the pleat configuration of the first and second groupings of fibers are completely opposite. When viewed in cross section, the exemplified pleat configurations appear as closed loops 630.

Various types of natural and synthetic fibers, as well as blends thereof, can be used to form the core non-woven fiber pad. Preferably, at least a portion of the fibers are provided as fibrous reclaimed carpet material having non-uniform linear densities and non-uniform fiber lengths. To that end, in some embodiments it is desired for the reclaimed carpet material to be present in an amount in the range from about 20 weight % to about 95% of the total weight of the core non-woven fiber pad. In alternative embodiments, the fibrous reclaimed carpet material can be present in amounts ranging from about 30 weight % to about 90 weight %, about 50 weight % to about 90 weight %, about 70 weight % to about 90 weight %, about 50 weight % to about 85 weight %, or about 75 weight % to about 85 weight % of the total weight of material the core non-woven fiber pad.

Reclaimed carpet material as used herein and unless the context clearly indicates otherwise includes fibrous material reclaimed from post consumer carpet (PCC). The post consumer carpet can be post commercial, post residential carpet, post industrial carpet, or any combination thereof. Additionally, the reclaimed carpet material can comprise pre-consumer fibrous materials including for example, manufacturing remnants and quality control failures.

By incorporating PCC into the fiber pad, several advantages can be realized. For example, second generation products incorporating the PCC have less of an environmental footprint relative to traditional fiber pads comprising only virgin materials. The use of PCC can also reduce the amount of traditional, often environmentally harmful materials that previously were sent to landfills, while still providing the same or similar level of fiber pad performance. Additionally, substitution of virgin material with PCC material can reduce the manufacturing costs associated with producing fiber pads. Still further, the incorporation of PCC material into a second generation fiber pad can also provide mechanical reinforcement or stability to the second generation fiber pad, if desired.

Suitable PCC material for forming the fiber pad can comprise fibers of one or more thermoplastic polymers, wherein the post consumer carpet fibers comprise nylon 6/6, nylon 6, polyester, polypropylene, polyethylene, polyurethane, polyvinyl chloride, polyethylene terephthalate, polytrimethylene terephthalate, latex, styrene butadiene rubber, or any combination thereof. In one embodiment, the PCC material comprises foam waste. In another embodiment, the PCC material does not comprise foam waste.

Additionally, the PCC material can comprise natural fibers, such as wool, cotton, or jute. PCC material comprising synthetic and/or natural materials described above can optionally be present as a fiber. The PCC material can also comprise fillers. The fillers can be any suitable filler, including, for example, aluminum oxide trihydrate (alumina), calcium carbonate, barium sulfate or mixtures thereof. The fillers can be virgin, waste material, or even reclaimed fillers.

The PCC material can be obtained from various component parts of prior manufactured carpet products, for example, and without limitation, a face layer, an adhesive layer, a backing layer, a secondary backing layer, an underlayment, a cushioning material, or a scrim. The PCC material can be obtained from a variety of sources. In one example, the PCC material can be obtained from a collection site. Approximately 50 collection sites are spread around the United States. The collection sites take in PCC which is then shipped to a facility for sorting by fiber type. Once sorted, baled material of the same fiber type is then shipped to a secondary location where various techniques are employed for reducing the large pieces of carpet to small chunks or shredded fiber to provide an amalgamated mixture. The amalgamated mixture will contain face fiber, primary backing, secondary backing, carpet binder and, in some cases, attached cushion. After this stage, the product can be used with or without further refinement or processing to remove additional contaminates.

Dependent on the end use and desired cost of the composite, the PCC material can comprise a coarse blend of ground/shredded PCC or a more refined material containing primarily opened carpet face fibers. An unexpected benefit of the processes disclosed herein is the use of the coarse slit tape fibers derived from primary and secondary backing materials. The coarse material/fibers provides a low-cost structural material that can serve as reinforcement for molded products as well as the fiber pad products described herein. In some embodiments, additional processing steps can be desirable. For example, the PCC material can be chopped or sheared into fiber or tape yarn lengths of from about $\frac{1}{64}$" to about $\frac{1}{2}$".

According to certain embodiments, the plurality of PCC fibers present within the core non-woven fiber pad have non-uniform linear densities and non-uniform fiber lengths. The plurality of non-uniform linear fiber densities can, for example, be in the range of from 1 to 25 denier. Still further, the plurality of non-uniform fibers can collectively provide an average linear fiber density that is, for example, greater than 5 denier, greater than 10 denier, greater than 15 denier, greater than 20 denier, or even greater than 25 denier.

Because fiber pads can be reconstructed from recycled content, the sustainability of the fiber pad described herein is substantial. It is contemplated that the relatively coarse deniers of PCC fibers, which typically range from about 10 denier per fiber to about 24 denier per fiber, can provide high melt material while permitting greater fiber resiliency, compression resistance, and dampening than conventional fibers. Also, it is contemplated that the coarser deniers of PCC fibers, which are inherently stronger than conventional fibers, can improve compression set resistance, as well as horizontal pad strength. It is further contemplated that the polypropylene, when present in PCC fibers, can also be beneficially used as low-melt content for holding fibers together. It is still further contemplated that the polypropylene present in PCC fibers can enhance the effect of singeing during the creation of a slip surface. Additionally, it is contemplated that PCC fibers can be pre-dyed or pigmented with color for improving the aesthetic appearance of the fiber pad. It is further contemplated that the PCC fibers can inherently possess stain resistant properties for improving cosmetic retention. It is still further contemplated that PCC fibers can comprise spin finish lubricants for easing processing through machinery.

It is specifically contemplated that the core layer can comprise fibrous PCC carcass materials, including, without limitation, backing layers, slip films, face fibers, and the like. In one exemplary embodiment, it is contemplated that the fibrous PCC carcass materials can comprise Nylon6/6 and polypropylene. In this embodiment, it is contemplated that the fibrous PCC carcass materials can be from about 20% to about 70% Nylon6/6, more preferably from about 30% to about 60% Nylon6/6, and most preferably from about 40% to about 50% Nylon6/6. It is further contemplated that the fibrous PCC carcass materials can be from about 1% to about 40% polypropylene, more preferably from about 5% to about 25% polypropylene, and most preferably from about 10% to about 20% polypropylene. Because of the consistencies of the fibrous PCC carcass materials, it is contemplated that the PCC materials in the core layer can be present in substantially consistent amounts and ratios. However, it is further contemplated that multiple fiber types and multiple cross-sections of fibers will be present in the core layer.

In an additional embodiment, the core layer can comprise a desired amount of at least one low-melt material which is configured to melt at a low temperature relative to surrounding, higher-melt materials therein the fiber pad while leaving the higher-melt materials intact. It is contemplated that, upon the application of sufficient heat to a core layer comprising low-melt material, the low-melt material can melt and flow onto adjacent fibers. It is further contemplated that, after the low-melt material is re-cured, adjacent fibers therein the fiber pad can effectively be glued together, thereby providing additional dimensional stability to the fiber pad. Typical manufacturers of low-melt materials as described herein include Wellman, Inc., Fiber Innovations, Inc., Huvis Corp., Tuntex Textile Co., Ltd., Stein, Inc., Reliance Industries, Ltd., and Teijin, Ltd. In one embodiment, the at least one low-melt material can comprise a fine denier low-melt material.

In another embodiment, the at least one low-melt material can comprise a low-melt fiber, including, for example and without limitation, low-melt polyester, polypropylene, polyethylene, copolyester, copolymer nylons, engineered olefins, conjugate filament-linear low-density polyethylene, acrylics, low-melt nylon, and the like. It is contemplated that the heating of a low-melt fiber in a fiber pad can create globules of low-melt polymer at crossover points where the low-melt fibers intersect with higher-melt fibers. In an additional embodiment, the at least one low-melt material can comprise glycol-modified polyethylene terephthalate (PETG).

In a further embodiment, the at least one low-melt material can comprise an elastomeric low-melt fiber, including, for example and without limitation, ethylene vinyl acetate (EVA), thermoplastic elastomers (TPE), thermoplastic rubbers, thermoplastic olefins, and the like. It is contemplated that the heating and re-curing of elastomeric low-melt fibers can create stretchable crossover points where the elastomeric low-melt fibers intersect with higher-melt fibers, thereby improving the load-bearing capabilities of the fiber pad.

In an additional embodiment, the at least one low-melt material can comprise a bi-component fiber having a portion of high- or standard-melt material and a portion of low-melt polymer. In this embodiment, the bi-component fiber configuration can be, for example and without limitation, islands-in-the-sea, side-by-side, core-sheath, and the like. It is contemplated that bi-component fibers can maintain their original structural integrity while also allowing each fiber to glue itself to adjacent fibers. It is further contemplated that the use of bi-component fibers increases the amount and strength of bonding between adjacent fibers due to the increased length of axial contact between the fibers. It is still further contemplated that any known materials having appropriate melt characteristics can be used to form the bi-component fibers.

In a further embodiment, the at least one low-melt material can comprise a low-melt powder, flake, or granule. It is contemplated that any of the above-referenced materials can be provided in a powder, flake, or granule form. In one embodiment, scattering machines can be used to evenly disperse the low-melt powders, flakes, and granules throughout a substrate. Manufacturers of these conventional scattering machines include TechnoPartner Samtronic, Technoboard, Caritec, and Schott Meissner.

In one embodiment, the desired amount of the at least one low-melt material can range from about 0% to about 80% of the total amount of material in the core layer, more preferably from about 5% to about 60% of the total amount of material in the core layer, and most preferably from about 10% to about 40% of the total amount of material in the core layer. In another embodiment, the at least one low-melt material can have a denier per foot from about 0.1 to about 30, more preferably from about 0.5 to about 15, and most preferably from about 1 to about 5. It is contemplated that the presence of low-melt material in these amounts can prevent the fibers of the core layer from bundling up, thereby permitting more efficient cutting of the fiber pad.

Optionally, the core layer can comprise a desired amount of spray-on binder liquids, including, for example and without limitation, acrylics, water-dispersed thermoplastics, cross-linked thermosets, polyurethanes, polymerizable compounds, and the like. It is contemplated that, upon exposure to elevated temperatures, these binders can cross-link, polymerize, and drive off water or solvents. It is further contemplated that, after exposure of the binders to elevated temperatures, residual portions of the binders can bond adjacent fibers together to improve the dimensional stability of the fiber pad. It is still further contemplated that these binders can be applied to the core layer using any spray-on techniques as are conventionally used in the pertinent art.

In an additional embodiment, the core layer can comprise a desired amount of long-staple polypropylene as is conventionally used in the pertinent art. In one embodiment, the polypropylene can be post-industrial polypropylene. In another embodiment, the desired amount of polypropylene can range from about 0% to about 90% of the total amount of material in the core layer, more preferably from about 10% to about 85% of the total amount of material in the core layer, and most preferably from about 20% to about 80% of the total amount of material in the core layer. It is contemplated that the core layer can comprise other post-industrial and virgin materials, including, for example and without limitation, polyester.

In addition to fibrous reclaimed carpet material described above, it should be appreciated that the core non-woven fiber layer can further comprise one or more impurities. For example, representative impurities that can be present in reclaimed carpet material and thus present in the core non-woven fiber layer include dirt, sand, inorganic filler, and other conventionally known waste materials that can be present in reclaimed carpet material.

The fiber pads described herein can further comprise at least one means for increasing the dimensional stability of the pleated core non-woven fiber layer. For example, a suitable means for increasing dimensional stability can comprise bonding at least two adjacent pleats together. The bonding of adjacent pleats can be a mechanical bonding, such as for example a horizontal needle punching. Alternatively, the bonding of adjacent pleats can be a thermal bonding. For example, low melt binder material within the pleated non-woven core layer can be heat treated above the melt point of the low melt binder in order to thermally bond adjacent pleats. Still further, adjacent pleats can also be chemically or adhesively bonded using, for example, any conventionally known adhesive material suitable for use in textile applications. It should be understood that each of the aforementioned means for increasing dimensional stability are optional and not required. Further, it is also contemplated that when desired, any two or more means for increasing dimensional stability can be used in combination.

Figure 7:
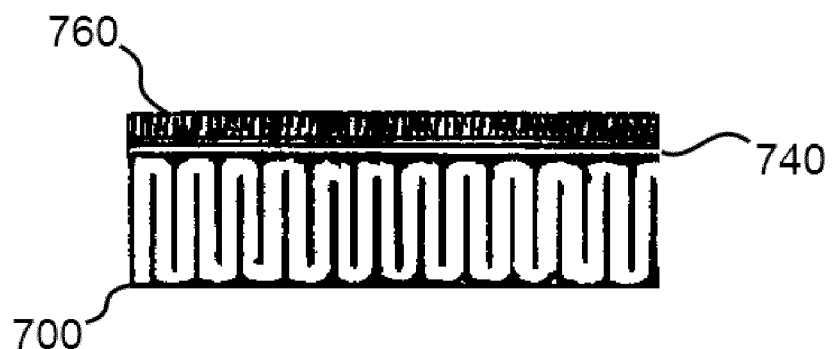
FIG. 7 is a cross sectional or side view of a pleated non-woven fiber pad of the present invention having a top layer affixed to the top surface thereof.

In still further embodiments, the means for increasing dimensional stability of the pleated core non-woven fiber layer can comprise a tie layer attached to a face of the pleated core layer. A tie layer can be attached to either the top face, the bottom face, or both top and bottom faces of the pleated non-woven fiber layer. For example, as shown in FIG. 7, a tie layer 760 can be attached thereto the upper surface 740 of the pleated non-woven fiber pad 700.

The tie layer can be, for example and without limitation, a non-woven scrim, a non-woven fiber layer, thermoplastic open mesh, netting, film, impregnated low-melt powder, impregnated low-melt fiber, and the like. The tie layer can further comprise any desired amount of fibrous PCC material as described herein. It is contemplated that the tie layer can comprise an adhesive film. In an additional embodiment, the tie layer can be cross-lapped with the core layer to provide additional stability. In this embodiment, it is contemplated that the tie layer can be needle punched to the upper surface of the core layer. In a further embodiment, the tie layer can be heat-fused or singed with calendar rolls, belted presses, heated platens, air, and other means conventionally used in the pertinent art. In an exemplary embodiment, the tie layer can be fused to the upper surface of the core layer using low-melt material present in the tie layer or scattered powders or spray adhesives as are conventionally used in the pertinent art. It is contemplated that the addition of the tie layer can improve the dimensional stability of the fiber pad by covering gaps that can be created when the folded fibers of the core layer are subjected to loads. The increase in tensile strength resulting from the addition of the tie layer can simplify the installation and handling of the fiber pad while consistently maintaining the dimensions of the fiber pad, thereby reducing stretching and thinning of the material. It is further contemplated that the tie layer of the fiber pad can more effectively distribute loads through the fiber pad, thereby improving the compression resistance and compression-set physical properties of the fiber pad.

It is contemplated that the tie layer can also function as a water-resistant or waterproof barrier between the fiber pad and other elements, such as flooring. In an additional embodiment, the tie layer can be treated with a bi-component film. In still another embodiment, the tie layer can comprise a fiber web. It is contemplated that the fiber web can provide additional strength and stability to the fiber pad.

Additionally, in a further embodiment, the tie layer secured thereto the fiber pad can function as a slip surface. It is contemplated that the presence of a top layer and/or bottom layer as described herein can enhance the slip characteristics of the fiber pad by decreasing friction between the fiber pad and flat surfaces. For example, the slip surface can be configured to have reduced frictional characteristics, thereby permitting carpet to slide over the slip surface with minimal drag and reducing disruption of the fiber pad.

In a further embodiment, the fiber pad can have any desired thickness and weight per square yard of material. In this embodiment, the weight per square yard of material can be selectively controlled by varying the sizes and types of materials used to produce the fiber pad, as well as the thickness of the fiber pad. In one embodiment, the thickness of the fiber pad can range from about 0.10 inches to about 7 inches, more preferably from about 0.15 inches to about 2 inches, and most preferably from about 0.20 inches to about 1 inch.

In another embodiment, the weight per square yard of fiber pad can range from about 5 ounces per square yard to about 100 ounces per square yard, more preferably from about 15 ounces per square yard to about 90 ounces per square yard, and most preferably from about 20 ounces per square yard to about 80 ounces per square yard. It is contemplated that due to the increase in resiliency provided by the pleated structures within the core layer, the overall density of the fiber pad can be decreased compared to densities of conventional fiber pads.

In still a further embodiment, it should be understood that the fiber pads described herein can have any desired volumetric density. For example, according to certain embodiments, the fiber pad can have a volumetric density greater than 2.0 pounds per cubic foot; greater than 3.0 pounds per cubic foot; greater than 4.0 pounds per cubic foot; greater than 5.0 pounds per cubic foot; greater than 6.0 pounds per cubic foot; greater than 7.0 pounds per cubic foot; or greater than 8.0 pounds per cubic foot. In still further embodiments, the volumetric density can be within any range of values derived from the volumetric density values set forth above.

In still a further embodiment, the fiber pad can have a desired color profile. In one embodiment, the color profile can be created by coloring the low melt components of the fiber pad. In another embodiment, the color profile can be created by heat-fusing a colored fiber to an outer surface of the fiber pad. In an additional embodiment, the color profile can be created by spraying colored ink onto at least one surface of the fiber pad using conventional ink jet spraying means. In still another embodiment, the color profile can be created by applying a uniform scrim to the top layer of the fiber pad and then applying a colored adhesive to the top layer. In a further embodiment, the color profile can be created by applying a colored film as the top or bottom layer of the fiber pad.

In one exemplary embodiment, it is contemplated that the fiber pad can comprise a bi-component low melt material. In this embodiment, the bi-component low melt material can be dope-dyed or solution-dyed. For example, and without limitation, the bi-component low melt material can be a black staple bi-component low melt material having about 2 denier per filament. In this embodiment, the staple bi-component low melt material can have a length of about three inches. It is contemplated that the bi-component low melt material can assist with permitting processing of shorter staple post consumer carpet as it passes through the machinery for processing and manufacturing the fiber pad. In an additional embodiment, the fiber pad can comprise a desired percentage by weight of bi-component low melt material. In this embodiment, the desired percentage by weight of bi-component low-melt material can be about 20%, more preferably about or above 30%. It is contemplated that the bi-component fiber can be used to produce the desired color profile and to improve the overall aesthetic appearance of the fiber pad.

Figure 8:
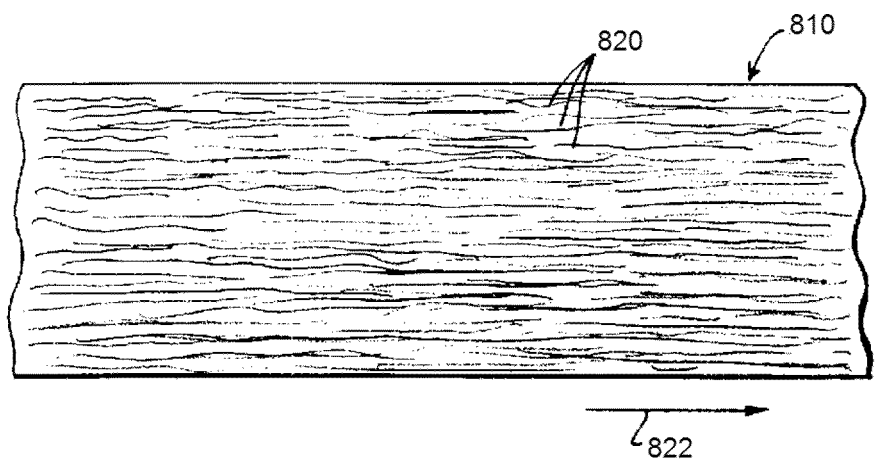
FIG. 8 is a top view showing a core non-pleated non-woven fiber pad comprised of fiber oriented in substantially parallel fashion on a moving conveyor.
Figure 8A:
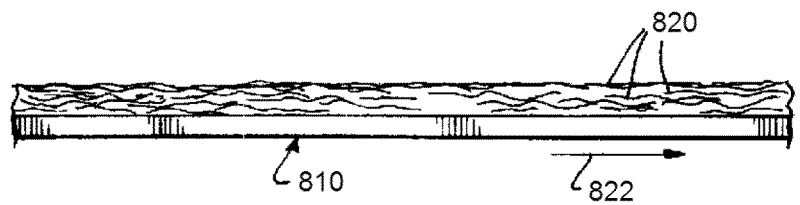
FIG. 8A is a side view showing the conveyor and fibers of FIG. 8.

The pleated non-woven fiber pads disclosed herein can be generally formed by any conventional means for folding a fiber pad into a desired pleated configuration. For example, in a preferred embodiment, conventional vertical lapping machines can be used to form a core non-woven fiber pad into the pleated product shown in FIG. 1. To that end, FIGS. 8 and 8A schematically illustrate a conveyor 810 holding a core non-woven fiber pad 820 and moving in a direction 822. As shown, the fibers 820 extend substantially parallel to the direction of movement 822 associated with conveyor 810. Conveyor 810 moves into a pleating section of an apparatus (not shown) as discussed above and, due to the orientation of fibers 820 as shown in FIGS. 8 and 8A, fibers 820 become reoriented within each pleat into a substantially vertical orientation. This orientation is best illustrated by the orientation of fibers 150 as shown in FIG. 2. Most preferably, fibers 820 are oriented vertically as illustrated in FIG. 2.

The core non-woven fiber pad can be produced by running each fiber layer through a carding machine configured to position a plurality of the fiber layer in a substantially parallel orientation. Alternatively, it is contemplated that the plurality of fibers can be positioned in the substantially parallel orientation using electrostatic, guarding, drafting, or combing means as are conventionally used in the art. As noted above, the method can further comprise providing a means for increasing the dimensional stability of the pleated non-woven fiber layer. For example, once the core non-woven pad is advanced through a pleating machine, adjacent pleats may optionally be bonded together thermally within an oven, or using liquid binders applied to the carded web prior to pleating, or mechanically using barbed needles which pass through adjacent pleats during the pleating operation, commonly referred to as horizontal needle punching.

In addition to the conventional pleating machine referenced above, it should be understood that a pleating machine can similarly be customized to provide suitable means for folding a fiber pad into any desired pleat configuration and that such means for folding will be different depending on the particular pleat configuration desired. For example, with reference to the exemplary pleat configurations illustrated in FIG. 3-6, a suitable means for folding a multiple groups of fibers into differing pleat configurations can comprise a plurality of blades. In this embodiment, the plurality of blades can be positioned proximate a distal end of the fiber layer such that the core non-woven fiber pad is advanced toward the plurality of blades. Each blade of the plurality of blades can be configured for reciprocation substantially perpendicularly to the reference plane of the fiber pad as the fiber layer advances in the longitudinal direction. In this embodiment, each blade of the plurality of blades can be configured to reciprocate at a selectively adjustable reciprocation rate. Each blade of the plurality of blades can also be configured to reciprocate at a predetermined reciprocation depth corresponding to the vertical position of the blade relative the reference plane. In this embodiment, it is contemplated that the reciprocation depth of each blade can be selectively adjustable as the fiber layer advances in the longitudinal direction in order to provide pleats of varying height. With reference to the exemplary pleat configurations illustrated in FIG. 3-6, it is contemplated that the reciprocation depth for each selected group of fibers can be selectively varied such that the desired pleated configuration is formed. It is further contemplated that the plurality of blades can be positioned such that each blade is configured to push a selected group of fibers upwardly as it reciprocates at the selected reciprocation rate and reciprocation depth.

In another embodiment, each blade of the plurality of blades can be coupled to a means for reciprocating the blade at the selected reciprocation rate and reciprocation depth. In this embodiment, it is contemplated that the means for reciprocating each blade of the plurality of blades can comprise a linear servo motor, moving coil linear actuator, and the like. It is further contemplated that the means for reciprocating each blade of the plurality of blades can be configured to provide precise linear movement to each blade with infinite control of position, speed, acceleration, and deceleration within the operating range of each device. It is still further contemplated that a plurality of linear servo motors as described herein can be positioned in a stacked arrangement proximate the distal end of the fiber layer, with each linear servo motor of the plurality of linear servo motors being coupled to a blade of the plurality of blades.

In still a further embodiment, each blade of the plurality of blades can be selectively moveable in one or more directions. In this embodiment, it is contemplated that each blade of the plurality of blades can be selectively moved such that the width of the blade aligns with a selected group of the plurality of substantially parallel fibers as the fiber layer advances in the longitudinal direction. It is further contemplated that each selected group of fibers can correspond to a predetermined number of adjacent substantially parallel fibers. Thus, the width of each blade can correspond to an aggregate width of the fibers making up each selected group.

In addition to the reciprocating bar technology associated with convention lapping machines, it is also contemplated that the vertical lapping or pleating of the core non-woven fiber layer can be formed using additional technology known as a wavemaker or fiberwave. This technology does not rely on the use of a reciprocating bar and is capable of producing vertical laps or pleats from a carded web, airlaid web, or a needled batt using a wheel type device that has cavities for the material to form into a pleat with no reciprocating action.

Optionally, the method of producing the fiber pad can comprise adding a colorant to the at least one layer of fibers. In one embodiment, the step of adding a colorant can comprise adding, for example and without limitation, color fibers, color powders, ink jet sprays, and the like to the at least one layer of fibers. Still further, the method of producing the fiber pad can comprise placing foam chips within the at least one layer of fibers.

As noted above, a tie layer can optionally be provided as a means for increasing the dimensional stability of the pleated non-woven core layer. Thus, the method of producing the fiber pad can further comprise attaching a tie layer to either the top or bottom face, or both the top and bottom face, of the pleated non-woven core layer. In one embodiment, the tie layer can comprise a film that is adhered to a face surface of the core layer. In this embodiment, the face surface of the core layer can be calendared by running the film across a heated roller without compressing the fiber pad. In an additional embodiment, the film can be applied under low pressure from PTFE coated rollers while hot air is passed over the fiber pad. It is contemplated that a scrim can be similarly formed. In still another embodiment, the tie layer can comprise a non-woven layer, including, for example and without limitation, spun lace, spun bond, a carded layer, or a cross-lapped layer. In this embodiment, the tie layer can be attached to the face surface of the core layer using conventional needle punching techniques. In one embodiment, the tie layer can have a desired color profile or can comprise colorants as described herein, including, for example and without limitation, color fibers, color powders, ink jet sprays, and the like. It is contemplated that a bottom layer can be applied to the core layer using the techniques described herein.

In another embodiment, the tie layer as described herein can comprise a slip surface. Additionally, it is contemplated that a slip surface can be attached to the lower surface of the core layer. In one embodiment, the slip surface can comprise a material layer of non-woven scrim, fabric, film, cured thermoset polymer coating, and the like. In one embodiment, the slip surface can be heat-fused. In this embodiment, the slip surface can be formed by melting of low melt or other thermoplastic material thereon the material layer. In this embodiment, the low melt or other thermoplastic material can comprise, for example and without limitation, low-melt materials present in the material layer, sprayed adhesives or polymers, scattered fibers, scattered powders, and the like. In an additional embodiment, after melting the low melt or other thermoplastic content thereon the material layer, the slip surface can be formed by heat singeing the material layer using calendar rolls, an infrared heater, gas flame lamination, electrical plasma, conductive heated platens, convective hot air, heated belts, a heated oven with dwell time, and the like. For example, and without limitation, it is contemplated that a conventional belted press system, including, for example and without limitation, a PTFE coated belt system coupled to a heated platen, can be used to heat-fuse the slip surface to the upper surface or the lower surface of the core layer.

Figure 9:
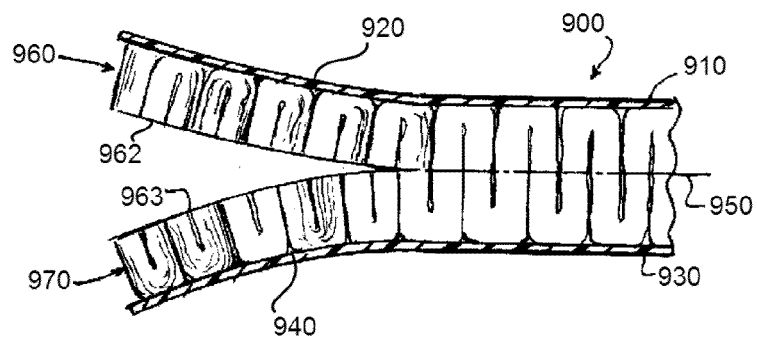
FIG. 9 is a cross sectional view schematically illustrating the process of skiving a pleated non-woven fiber pad in accordance with the invention

After the fiber pad is formed, the method of producing the fiber pad can optionally comprise skiving the fiber pad to produce thinner or smaller fiber pads. In one embodiment, the step of skiving the fiber pad can occur in the same in-line process as the earlier fiber pad production steps. Alternatively, the step of skiving the fiber pad can occur in a separate machine. In another embodiment, the step of skiving can occur in a conventional skiving machine, a band knife cutting machine, or a shearing machine. More specifically, FIG. 9 illustrates a pleated non-woven fiber pad 900 having a top layer 910 attached to the top face 920 and a bottom layer 930 attached to the bottom face 940. As schematically illustrated, the pleated core non-woven layer is preferably split along a central plane 950 to create two mirror image products 960, 970 comprised of half pleats 962, 963 connected, respectively, to the top and bottom layers 910, 930 after splitting.

Optionally, the method of producing the fiber pad can further comprise a sanitization step. It is contemplated that the presence of impurities in reclaimed carpet material can necessitate a need to sanitize the reclaimed materials for health and safety purposes. To that end, the reclaimed carpet material can be subjected to a sanitization step at any point during the manufacture of the fiber pad including, sanitizing the reclaimed carpet material prior to forming the core fiber layer, after forming the core fiber layer but before pleating the core fiber layer, or even after pleating the core fiber layer.

Still further, the method can comprise the steps of winding up the fiber pad to create a roll of material and packaging the fiber pad in a desired format.

EXAMPLES

To further illustrate the principles of the present invention, the following examples are put forth so as to provide those of ordinary skill in the art with a further description of how the various aspects of the invention disclosed herein can be made and/or evaluated. More specifically, in the following examples the durability of various fiber pads of the present invention were evaluated as a function of thickness lost. The results indicate that the various embodiments of the inventive fiber pads levels of durability equal to or exceeding that of conventional foam pad materials. It should be understood however that these examples are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric or full vacuum.

Figure 10:
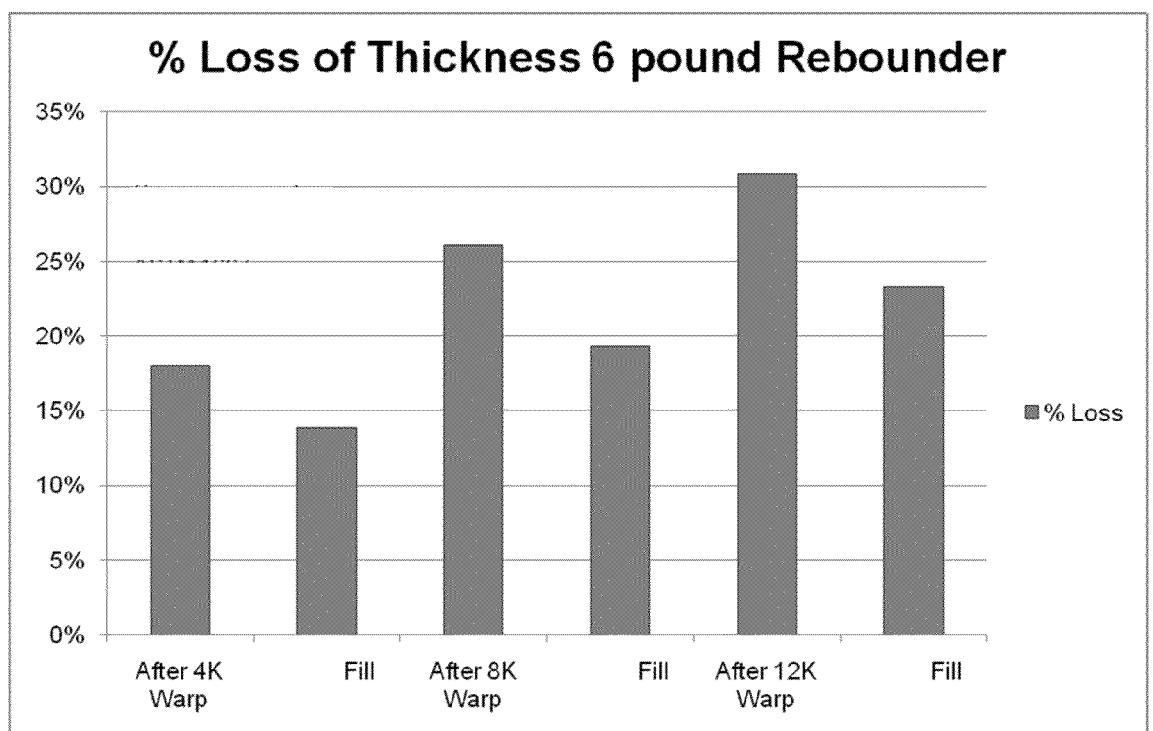
FIG. 10 is a chart illustrating the results of hexapod durability testing of certain pleated pads according to embodiments of the present invention.

An initial durability evaluation was performed on pleated fiber pads that were not skived and which did not comprise a tie layer on either the top or bottom face of the pleated core non-woven fiber pad. Prior to testing, the pleated pad had a nominal thickness approximately twice that of the skived samples evaluated in later examples discussed below. The testing procedure comprised subjecting the samples to a conventional hexapod test with 4000, 8000, and 12,000 cycle milestones for measuring percent thickness loss. Samples were subjected to the hexapod in both the warp direction as well as the fill direction. During these tests, which were performed according to ASTM 1667 standards, the initial compression was set at 3.7% and the final compression was set at 10.0%. The results of these initial tests are shown in FIG. 10 and indicate that the fill direction tests out-performed that of the warp direction. However, both warp and fill embodiments steadily sustained an increase in percentage thickness loss as the number of hexapod cycles increased from 4000, to 8000, and eventually to 12,000 cycles.

Additional samples were subsequently evaluated to test the impact of a tie layer on product durability. Specifically, a series of 10 samples of pleated pad according to the present invention were prepared according to the following procedures. The 10 pad types were cut into 18"×8" sections, one group of 10 was cut in the warp direction and a group of 10 cut in the fill direction. The warp and fill direction are referring to the direction of the waved pleats in the pad. The warp direction would be consistent with the pleats in the 8" direction where as the fill would refer the 90 degree rotation so as the pleat would be in the fill direction. This directional orientation of the pad is easily seen from the top or bottom surface. The pad selected for this test was a 5.48 pound per cubic foot square material with an original thickness of 0.72 inches. The compression set was 14.2%. The compression resistance measurements were 2.0 at 10%, 4.6 at 20%, 7.5 at 30%, 12.1 at 40%, 20.4 at 50%, 39.3 at 60%, 97.9 at 70%, 379.5 at 80% and 1890.1 at 90%. These compression resistance measurement procedures are in accordance with ASTM 3676, section 13 testing procedure.

The pad used in the testing consists of 76% Shredded Post Consumer Carpet carcass (carcass is the term used for the remains of carpet after the tufted yarn was sheared from the top) is essentially the scalped carpet. 19% Bi-component polyester fiber 2 dpfx2" long and 5% post industrial polypropylene cut filament 3 to 3.5 inches long. The 8 of the 18"×8" sections were skived to a nominal thickness of 0.50"+−0.1" and prepared for a tie layer.

The tie layer testing conditions were as indicated in Table 1 below. A single warp section and a single fill section were selected at random for each of the testing conditions. As shown, sample A evaluated on the warp direction receive a tie layer comprised of a combination of film and netting attached to the top face of the pleated pad and no tie layer on the bottom face. Sample B received the same tie layer configuration but was evaluated in the fill direction. In the subsequent samples C through H the term both indicates the film portion of the tie layer was present on the top and bottom faces. Similarly, the term none indicates that the netting portion of the tie layer was not present. Netting was not considered for use on the bottom due to cost constraints of the finished product.

TABLE 1

| Test Condition | A 1-W | B 1-F | C 2-W | D 2-F | E 3-W | F 3-F | G 4-W | H 4-F |
|---|---|---|---|---|---|---|---|---|
| Film | Top | Top | Top | Top | Both | Both | Both | Both |
| Netting | Top | Top | None | None | Top | Top | None | None |
| Orientation | Warp | Fill | Warp | Fill | Warp | Fill | Warp | Fill |
| 4k cycles | 0.1449 | 0.1283 | 0.14 | 0.256 | 0.1477 | 0.174 | 0.1329 | 0.1527 |
| 8k cycles | 0.2022 | 0.2002 | 0.2216 | 0.2967 | 0.2106 | 0.2744 | 0.2058 | 0.2273 |

The samples measured post hexapod showed improved (decreased) percentage loss of thickness relative to the unskived pad material without any tie layer. Additionally, even though the samples were relatively thinner (skived) and the skived or cut portions were exposed to the floor, the samples showed approximately 36% less product loss based on thickness loss from original thickness. Additionally the best performing material was a product with netting on top and no film on the bottom. The data from sample D was not indicative of these results however. This was due to complications resulting from inadequate adherence of the film tie layer to the sample prior to testing.

Subsequent samples have been evaluated to test a variety of film types and film thicknesses as tie layers. Specifically, these tests evaluated a range of films having a minimum thickness of 0.75 mil and a maximum thickness of 3 mil. The film was applied by means of a heated roller with a temperature range of 140-155 degrees C. Two configurations of netting were used. They can be identified as a 4×2 and a 4×4 netting. This is the number of strands per inch of the netting fabric. As in the prior trials, there were samples created with films, netting and films. These applications of material were only added to the top since the raw padding is to be skived to the proper thickness. The lapping machine used in the current trial state was not able to make the samples having a desired pad thickness of 0.4-0.5 inches. As such, it has again been determined that from a manufacturing standpoint, providing thicker material is more cost effective to produce and can then be subsequently skived to provide the desired pad thickness. For example, it is possible to produce pleated material on a vertical lapping machine having approximately a 1.5 inch thickness and subsequently skiving this material into three or more layers.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A fiber pad comprising:
a core non-woven fiber layer having a longitudinal axis and being formed into a plurality of pleats, said pleats extending in a direction transverse to said longitudinal axis and forming opposite top and bottom faces of the core non-woven fiber layer,
wherein the core non-woven fiber layer comprises post consumer carpet fibers having non-uniform linear density and non-uniform fiber lengths, wherein at least portion of the post consumer carpet fibers extend in a direction substantially transverse to said longitudinal axis between opposite the top and bottom faces within the pleats, wherein the plurality of pleats comprises a plurality of male pleat elements, and wherein a first portion of the plurality of male pleat elements are offset from a second portion of the plurality of male pleat elements along the longitudinal axis of the core non-woven fiber layer.

2. The fiber pad of claim 1, further comprising a volumetric density greater than 4.5 pounds per cubic foot.

3. The fiber pad of claim 1, further comprising a volumetric density greater than 6.0 pounds per cubic foot.

4. The fiber pad of claim 1, further comprising a volumetric density greater than 8.0 pounds per cubic foot.

5. The fiber pad of claim 1, wherein the post consumer carpet fibers have an average fiber linear density greater than 5 denier.

6. The fiber pad of claim 1, wherein the post consumer carpet fibers have an average fiber linear density greater than 15 denier.

7. The fiber pad of claim 1, wherein the post consumer carpet fibers comprise at least one thermoplastic polymer.

8. The fiber pad of claim 1, wherein the post consumer carpet fibers comprise at least one of nylon 6/6, nylon 6, polyester, polypropylene, polyethylene, polyurethane, polyvinyl chloride, polyethylene terephthalate, polytrimethylene terephthalate, latex, and styrene butadiene rubber.

9. The fiber pad of claim 1, wherein the core non-woven fiber layer comprises from 70 weight percent to 90 weight percent post consumer carpet fibers.

10. The fiber pad of claim 1, wherein the core non-woven fiber layer comprises from 75 weight percent to 85 weight percent post consumer carpet fibers.

11. The fiber pad of claim 1, wherein the pleated non-woven fiber layer further comprises a plurality of low melt binder fibers.

12. The fiber pad of claim 11, wherein the pleated non-woven fiber layer comprises from 5 weight percent to 45 weight percent low melt binder fibers.

13. The fiber pad of claim 1, wherein the core non-woven fiber layer comprises at least one impurity.

14. The fiber pad of claim 13, wherein the at least one impurity comprises at least one of dirt, sand, inorganic filler, and waste material.

15. The fiber pad of claim 1, further comprising at least one means for increasing dimensional stability of the pleated core non-woven fiber layer.

16. The fiber pad of claim 15, wherein the means for increasing dimensional stability comprises bonding at least two adjacent pleats together.

17. The fiber pad of claim 16, wherein the at least two adjacent pleats are mechanically bonded together.

18. The fiber pad of claim 17, wherein the mechanical bond comprises needle punching the at least two adjacent pleats together.

19. The fiber pad of claim 16, wherein the at least two adjacent pleats are thermally bonded together.

20. The fiber pad of claim 16, wherein the at least two adjacent pleats are adhesively bonded together.

21. The fiber pad of claim 15, wherein the means for increasing dimensional stability comprises a tie layer attached to a face of the pleated core non-woven layer.

22. The fiber pad of claim 21, wherein the tie layer is attached to the top face of the pleated core non-woven fiber layer.

23. The fiber pad of claim 21, wherein the tie layer is attached to the bottom face of the pleated core non-woven fiber layer.

24. The fiber pad of claim 21, wherein the tie layer comprises a film.

25. The fiber pad of claim 21, wherein the tie layer comprises a non-woven fiber layer.

26. The fiber pad of claim 1, wherein the post consumer carpet fibers are sanitized.

27. The fiber pad of claim 1, wherein each of the plurality of pleats comprises a substantially uniform pleat height.

28. The fiber pad of claim 1, wherein at least one of the plurality of pleats comprise a first pleat height and at least one of the plurality of pleats comprise a second pleat height different from the first pleat height.

29. The fiber pad of claim 28, wherein the at least one pleat having the first pleat height is adjacent to the at least one pleat having the second different pleat height.

30. The fiber pad of claim 1, wherein the core non-woven fiber layer comprises a first side edge and a second opposed side edge and wherein at least one pleat extends continuously from the first side edge to the second side edge.

31. The fiber pad of claim 1, wherein the first portion of the plurality of male pleats is interdigitated with the second portion of the plurality of male pleats.

* * * * *